Oct. 10, 1944.　　　F. A. QUIROZ　　　2,359,938
FLUID STRAINER
Filed Jan. 16, 1943　　　2 Sheets-Sheet 1
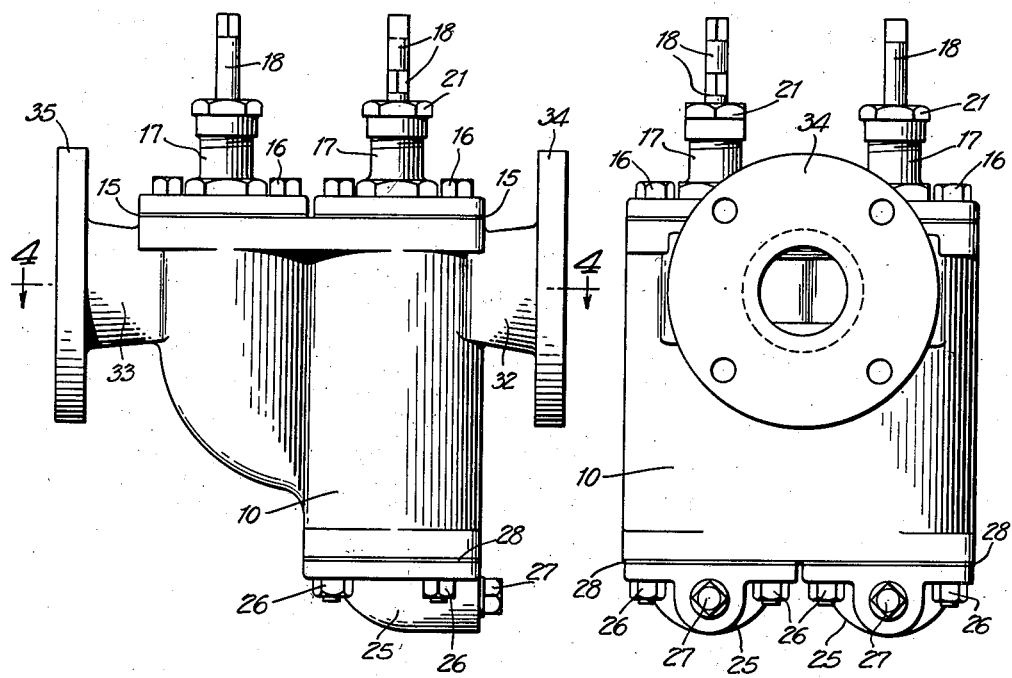
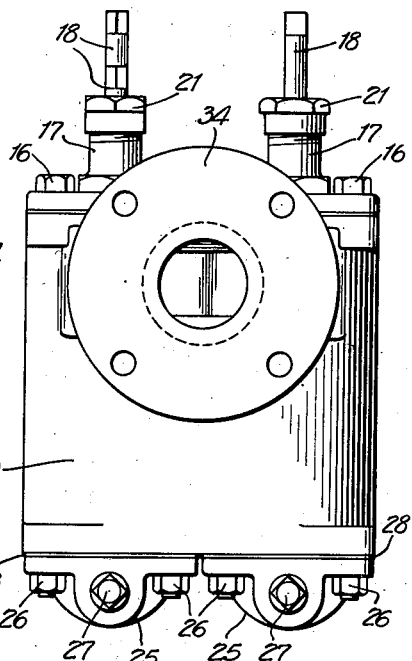
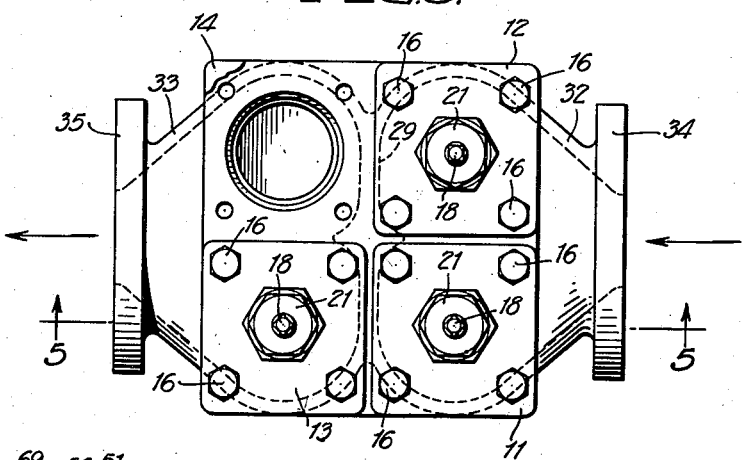
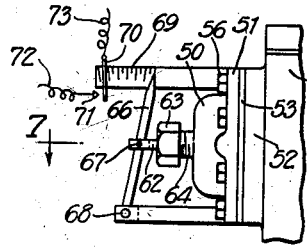
INVENTOR.
FRANCISCO ANGEL QUIROZ.
BY
ATTORNEYS.

Oct. 10, 1944.   F. A. QUIROZ   2,359,938
FLUID STRAINER
Filed Jan. 16, 1943   2 Sheets-Sheet 2
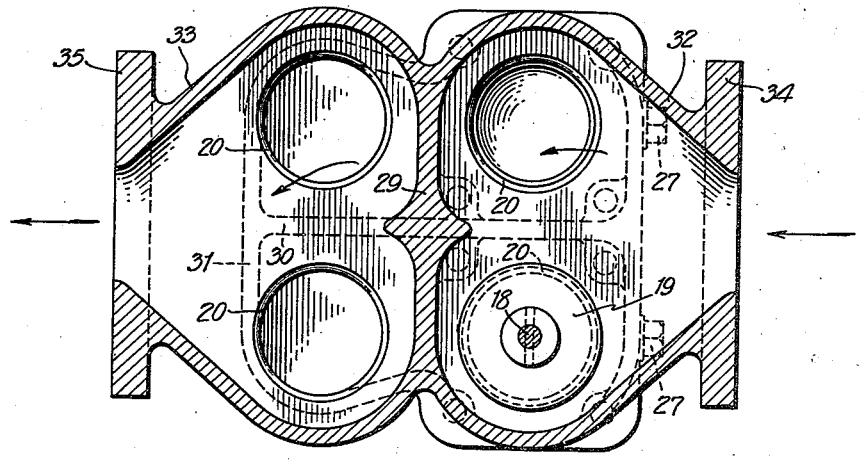
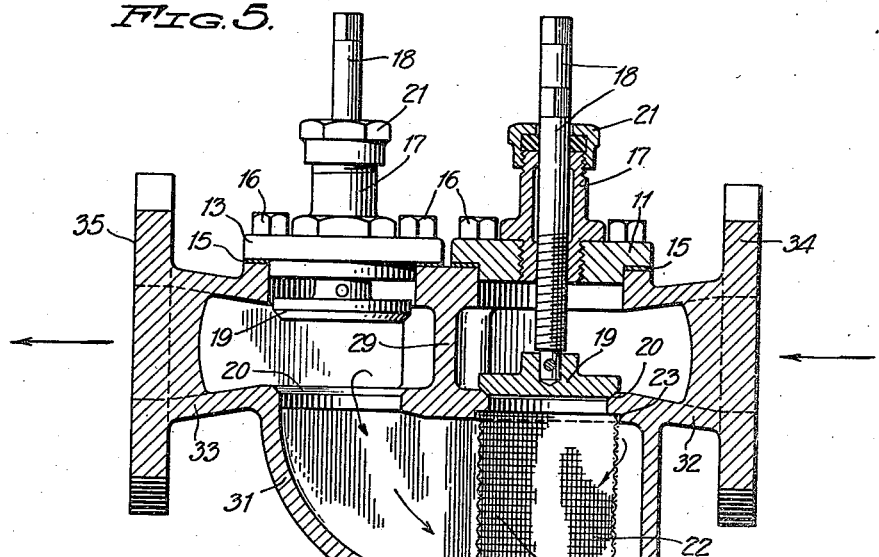
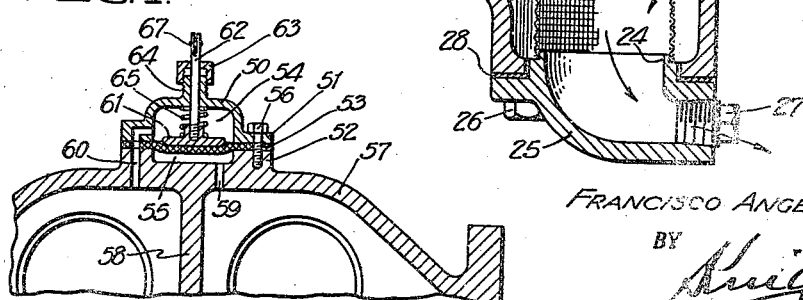
INVENTOR.
FRANCISCO ANGEL QUIROZ.
BY Patented Oct. 10, 1944

2,359,938

UNITED STATES PATENT OFFICE 2,359,938

FLUID STRAINER

Francisco Angel Quiroz, Newark, N. J.

Application January 16, 1943, Serial No. 472,538

4 Claims. (Cl. 210—168)

This invention relates in general to strainers for removing suspended matter from fluids, such as air, steam, water and other gases, vapors and liquids. It is particularly concerned with the provision of a unit system strainer, for industrial, marine, municipal or commercial use, in which two or more complete strainer units are arranged in parallel relation for simultaneous or selective service, thus permitting continued operation of the system while temporarily shutting down one or more of the units for cleaning, repair or replacement of the strainer member.

In general, the construction according to my invention may advantageously comprise two or more parallel strainer paths or units, branching from a common inlet and delivering through a common discharge orifice, each unit having its own strainer member and provided with suitable valves to selectively place it in service or disconnect it from the rest of the system. Normally the incoming body of liquid is divided into separate streams which are passed through the respective strainer members in service, and the separate streams of liquid from the different units are brought together and discharged through a common outlet leading to the boiler, storage reservoir or other destination. Each path has its individual inlet and outlet controlled by its respective inlet and outlet valves, both of which are open during service. A drainage chamber or trap is disposed beneath the interior of each strainer member to collect solid matter removed from the liquid. This trap or drainage chamber is normally kept closed by means of a drainage plug or other form of valve, so that it constitutes a dead space unaffected by the current of fluid passing through the strainer unit above it. By closing the inlet valve to a selected unit and opening the discharge orifice which is located in the drainage chamber, liquid from the discharge side of the system is permitted to pass in reverse flow through the strainer member and is discharged from the system through the drainage chamber, thus cleaning the strainer member and flushing out the solids which have accumulated in the drainage chamber. By closing both inlet and outlet valves of a selected strainer unit and thus segregating it from the liquid passing through the system, the strainer unit may be opened to the outside. This permits removal of a strainer member for repair or replacement without interrupting the service of the system as a whole.

A further feature of the invention resides in the provision of an automatic indicator, alarm or other relay device, operated by the difference in pressure between the inlet and outlet sides of the system to shown the condition of the strainer members and/or to effect shutting down of the service when cleaning or replacement of the strainer units is necessary.

The invention is illustrated in the accompanying drawings, in which—

Figures 1 and 2 are side and end elevations, respectively, of a composite strainer embodying two strainer units, and Figure 3 is a top plan view thereof with the cover plate removed from the discharge side of one of the units.

Figure 4 is a horizontal section of the strainer on the plane 4—4 of Figure 1.

Figure 5 is a vertical section of the strainer on the plane 5—5 of Figure 3.

Figure 6 is a detail view of a modification of the construction shown in Figures 1 to 5 inclusive, illustrating in elevation part of a hydraulic indicator or relay unit which may be attached to the strainer for operation by the pressure difference between inlet and outlet sides of the system; and Figure 7 is a transverse fragmentary section of the modification shown in Figure 6 and adjacent parts, taken on the plane 7—7 of that figure.

Since the principles of the unit system strainer are adequately illustrated by a system in which two units are employed, a duplex strainer has been selected for the purpose of explaining the invention to those skilled in the art. It will, of course, be understood that more than two units may be embodied when desired.

Referring in detail to the drawings, the strainer comprises a main casting or housing 10 on which are fitted the inlet valve cover plates 11, 12 and the outlet valve cover plates 13, 14 which are secured thereon with intervening gasket 15 by means of bolts 16. A valve stem bearing member or bonnet 17 is threaded into each of the cover plates, as ilustrated most clearly in Figure 5, and receives a valve stem 18 carrying at its lower end a valve 19 which seats upon a valve seat 20. A gland and packing nut 21 prevent fluid leakage around the upper portion of the valve stem. This construction of valve mechanism is duplicated in the inlet and outlet sides of each unit. A strainer member or basket 22 is mounted beneath the inlet valve of each unit (see Figure 5), the construction shown embodying by way of example a hollow cylinder of wire cloth mounted at the top in an annular recess 23 beneath the inlet valve and at the bottom fitted over an annular shoulder or rim 24 of a trap or drainage chamber casting 25 which is mounted against the bottom of the main casting 10 beneath the strainer member chamber and secured in place by means of bolts 26. A removable plug 27 normally closes a drainage orifice in the casting 25. A gasket 28 intervenes between the bottom of the main casting 10 and the upper portion of the drainage chamber casting 25.

The main casting provides an inlet chamber and an outlet chamber common to all the units, the inlet chamber being separated from the outlet chamber by the transverse wall 29 and from the individual strainer units by the bottom wall of the inlet and outlet chambers in which the valves are seated. While the respective units are thus in communication with each other when the valves are unseated, they are separated from each other below this plane by the longitudinal and transverse walls 30 and 31. An inlet neck 32 and outlet neck 33 provide passageway into the inlet chamber and from the outlet chamber, these neck portions being provided with flanges 34 and 35 by which the strainer may be connected to the mains.

With the construction thus far described, it will be apparent that the incoming fluid to be strained enters by way of the common inlet passage in the neck 32 and is divided into separate streams which enter and pass through the respective units which are open. These streams are brought together and discharged through a common outlet passage in the neck 33. By closing off either an inlet or outlet valve of a unit, such unit is obviously disconected from service. If it is desired to clean the strainer of such unit, the inlet valve is closed and the outlet valve opened. The drainage plug 27 is then removed, whereupon the discharge side of the system will furnish a reverse flow of liquid through the strainer basket 22 and the drainage chamber therebelow, thus clearing the wire mesh of the strainer basket and flushing out the accumulated solid matter in the drainage chamber. Upon closing both inlet and outlet valves of the unit, the drainage chamber casting 25 may be unbolted and removed to withdraw the strainer basket 22, without interrupting the continued operation of the rest of the system. This, it be understood, is occasionally necessary for special repair or reconditioning of the strainer member, or perhaps to replace an old or ruptured basket with a new one.

By reference to Figures 6 and 7, it will be observed that my invention may include a pressure-responsive device by which the drop in pressure between inlet and outlet sides of the system may be observed and utilized to furnish information as to the condition of the strainer members as affected by the accumulation of solid matter which tends to obstruct the free flow of liquid therethrough. The construction chosen for ilustration embodies a dome-shaped casting 50 flanged at 51 to fit upon a projecting annular boss 52 with an intervening flexible diaphragm 53 which separates the low pressure chamber 54 from the high pressure chamber 55. The casting 50 may be secured in place by bolts 56. The annular boss 52 forms a part of the upper portion of the side wall of the main casting 57, where the inlet and outlet chambers are separated by the transverse wall 58. A high pressure passage 59 leads from the intake chamber to the high pressure chamber 55 beneath the flexible diaphragm 53, and a low presure passage 60 leads from the low pressure chamber 54 into the outlet chamber of the strainer. A plunger member 61, mounted on a stem 62 passing through a gland 63 and supporting guide 64, is urged by a spring 65 against the low pressure side of the flexible diaphragm 53. This diaphragm and plunger member will, therefore, assume a position of equilibrium representing the difference in pressure between the inlet chamber of the strainer on the one hand, and the spring pressure and outlet chamber pressure on the other hand. Motion of the stem 62 may be translated, for example, to a pointer 66 (see Figure 6) which is pivoted to the stem at 67 and to a stationary support at 68 so as to move over a scale bar 69 suitably mounted with respect to the pointer. This pointer 66 in its outward travel, due to increased pressure difference between inlet and outlet sides of the strainer system, may engage a movable switch member 70 to move it into contact with the contact member 71 to close an electric circuit represented diagrammatically by the lead wires 72 and 73. The particular function performed as a result of closing this electric circuit may obviously be quite variable. It may, for example, actuate a visible or audible signal or recording device or a relay for automatically shutting down the system when excessive pressure difference occurs.

I claim:

1. A fluid strainer comprising a plurality of intercommunicating strainer units leading downward in parallel relation from a common fluid inlet passage and upward into a common outlet passage, an inlet valve for controlling the admission of fluid into each unit independently of another, each unit having at its under portion a normally closed drainage passage leading from its interior to a point outside the system to discharge a reverse current of fluid from said common outlet passage when the inlet valve of said unit is closed and said drainage passage is open.

2. A fluid strainer comprising a plurality of intercommunicating strainer units leading downward from a common intake passage and upward into a common outlet passage, each unit having at its upper portion intake and outlet valves independent of another unit, and at its under portion a removable closure by which access to the interior of the unit may be gained while its intake and outlet valves are closed, without interrupting the flow of fluid through another unit.

3. A fluid strainer comprising a main casting providing in its upper portion inlet and outlet chambers separated from each other by a transverse wall, strainer units having passages extending downward from said inlet chamber and then upward into said outlet chamber, valve openings in the bottom walls of said inlet and outlet chambers, inlet and outlet valves operating to open and close said valve openings, a drainage chamber casting removably secured to the bottom of each strainer unit, and a vertically disposed strainer basket confined in the downwardly extending passage between the top of said drainage chamber casting and the inlet valve seat of each unit.

4. A fluid strainer comprising a main casting providing in its upper portion inlet and outlet chambers separated from each other by a vertical transverse wall, strainer units having passages extending downward from said inlet chamber and then upward into said outlet chamber, a horizontal wall forming the bottom of said chambers to separate them from said strainer units and provided with valve-controlled openings through which access to and from the passages of said strainer units is established, valves for opening and closing the passages of said strainer units, and a vertical longitudinal wall segregating the strainer units from each other beneath the horizontal bottom wall of said inlet and outlet chambers.

FRANCISCO ANGEL QUIROZ.